United States Patent Office 3,425,793
Patented Feb. 4, 1969

3,425,793
PROCESS FOR FRACTIONATING LANTHANIDE MIXTURES CONTAINING CERIUM
Donald J. Bauer and Roald E. Lindstrom, Reno, Nev., assignors to the United States of America as represented by the Secretary of the Interior
No Drawing. Filed June 8, 1966, Ser. No. 556,821
U.S. Cl. 23—20                               9 Claims
Int. Cl. C22b 59/00

ABSTRACT OF THE DISCLOSURE

A cerium- and lanthanum-containing lanthanide solution is contacted with ozone, while the solution is maintained at a pH of 1.0 to 7.0, and a temperature of 20–100° C., to precipitate out the cerium and to leave the lanthanum in solution. At a pH of 1.0 to 5.5 and a temperature of 20–50° C., cerium can be separated from heavier lanthanides in the same manner.

---

This invention relates to the separation of lanthanum and cerium from one another and from heavier lanthanides.

Lanthanides are usually obtained mixed together from ore concentrate, and are difficult to separate due to their great chemical similarity. Classical separation techniques are time consuming, result in low yields, and frequently require expensive reagents which contaminate the product. Ion exchange and solvent extraction are efficient separation techniques but usually require elaborate processing sequences.

It is an object of this invention to provide a simple method for efficiently separating high purity cerium from other lanthanides. A further object is to provide a method for separating high purity lanthanum from cerium and heavier lanthanides. Another object is to provide a method for upgrading the heavier lanthanides when mixed with cerium or cerium and lanthanum. A still further object is to provide a method for separating lanthanides from one another without the addition of contaminating ions.

It has now been discovered that ozone will specifically precipitate high purity $CeO_2$ from a mixture of lanthanides or will precipitate a mixture of $CeO_2$ and heavier lanthanides.

Other objects and advantages of this invention will be obvious from a detailed description of the invention appearing in the following specification.

A mixture containing cerium or cerium and lanthanum such as an ore concentrate is put into solution by standard techniques. A solution pH of from about 1.0 to about 7.0 is established. Ozone is then bubbled through the solution until precipitation of nonhydrated $CeO_2$ alone or with oxides of heavier lanthanide is complete. An agent such as ammonia gas, $NH_4OH$ or $NaOH$, should be simultaneously added with the ozone to neutralize the acid formed and thereby maintain the desired pH. Ammonia gas is preferred because it does not dilute the solution or cause high local pH values which tend to undesirably precipitate other lanthanides. The remaining solution and precipitate are separated from one another by standard techniques. A solvent such as a mineral acid readily dissolves the separated precipitate for further treatment.

Operating temperatures and solution pH are varied depending upon the desired products and upon the particular lanthanides mixed with the cerium. For example, by maintaining the solution at from about 20° C. to about 50° C., preferably at ambient temperature, and a pH of from about 3.5 to about 5.5, a 99+ percent precipitation of 90+ percent $CeO_2$ can be attained. Temperatures much below room temperatures result in lower $CeO_2$ recovery rates. If lanthanum is present in the solution, $CeO_2$ and oxides of the heavier lanthanides can be coprecipitated by operating at an elevated temperature (preferably about 50° C. to about 100° C.) and a higher pH (about 6.0 to about 7.0), whereby the remaining solution can contain as high as 88 percent of the lanthanum at 94+ percent purity. Lower temperatures could be employed in the presence of lanthanum, but the lanthanum in the filtrate would be of lower purity.

When lanthanum is present, a two-step operation can be employed; the first operation involving coprecipitating the cerium and heavier lanthanides by operating at an elevated temperature and a high pH (about 6 to about 7) thereby leaving substantially only lanthanum in the remaining solution; the second operation involving forming a solution with the precipitate of the first operation (e.g., dissolving it in a solvent such as nitric acid), and precipitating $CeO_2$ from this solution by operating at a temperature of from about 20° C. to about 50° C., preferably at ambient temperature, and a lower pH thereby leaving the solution concentrated with the heavier lanthanides.

When operating at ambient temperatures, the particular solution into which the ozone is injected is not critical. Nitrate, chloride and sulfate solutions are suitable. However, a solution anion which exhibits inverse solubility characteristics in combination with lanthanides, such as lanthanide sulfates, should not be employed for elevated temperature operations.

As will be apparent to those skilled in the art, lanthanide solution concentrations and the amount of ozone to be added can be varied considerably.

To specifically illustrate the process, a plurality of nitrate, chloride and sulfate test solutions were prepared from a bastnasite concentrate having the following composition.

| Lanthanide species: | Analysis, percent oxides |
|---|---|
| $La_2O_3$ | 32 |
| $CeO_2$ | 53 |
| $Pr_6O_{11}$ | 3.4 |
| $Nd_2O_3$ | 11 |
| $Sm_2O_3$ | 0.6 |
| | 100.0 |

Each test solution contained 15 grams of lanthanide oxides per liter. Gaseous ozone was bubbled through each solution at a rate of 3.5 grams per hour. Operating temperatures and solution pH were varied for each. Ammonia gas was simultaneously added with the ozone to maintain the pH. The following results were obtained:

| Test No. | Anion | pH | Temp., °C | Ozonation time, hrs. | CeO₂ recovery, percent | CeO₂ purity, percent | La₂O₃ recovery in filtrate, percent | La₂O₃ purity, percent |
|---|---|---|---|---|---|---|---|---|
| 1 | NO₃ | 3.0 | 25 | 3 | 73 | 93 | | |
| 2 | NO₃ | 4.5 | 25 | 3 | 99.2 | 93 | 98 | 75 |
| 3 | NO₃ | 5.0 | 25 | 2 | 99.1 | 93 | 98 | 73 |
| 4 | NO₃ | 5.5 | 25 | 1 | 98.8 | 89 | | |
| 5 | Cl | 3.5 | 25 | 3 | 36 | 89 | | |
| 6 | Cl | 4.5 | 25 | 3 | 98 | 98 | 98 | 70 |
| 7 | Cl | 5.5 | 25 | 2 | 99.2 | 92 | 94 | 75 |
| 8 | Cl | 6.5 | 25 | 1 | 99.8 | 76 | 90 | 88 |
| 9 | SO₄ | 1.5 | 25 | 3 | 93 | 79 | 88 | 63 |
| 10 | SO₄ | 2.6 | 25 | 2 | 97 | 86 | 92 | 67 |
| 11 | SO₄ | 3.5 | 25 | 2 | 99.3 | 85 | 93 | 69 |
| 12 | SO₄ | 4.5 | 25 | 2 | 99.8 | 86 | 93 | 70 |
| 13 | SO₄ | 5.5 | 25 | 2 | 99.6 | 92 | 95 | 75 |
| 14 | NO₃ | 5.5 | 85 | ½ | 99.4 | 72 | 78 | 90 |
| 15 | NO₃ | 6.5 | 85 | ½ | 99.9 | 70 | 80 | 96 |
| 16 | Cl | 3.5 | 85 | 1 | 58 | 95 | 94 | 51 |
| 17 | Cl | 4.5 | 85 | 1 | 99.9 | 90 | 97 | 75 |
| 18 | Cl | 5.5 | 85 | 1 | 99.3 | 80 | 90 | 82 |
| 19 | Cl | 6.5 | 85 | ½ | 99.7 | 72 | 88 | 94 |
| 20 | NO₃ | 6.5 | 85 | ½ | | | 89 | 95 |
| 21 | NO₃ | 4.5 | 25 | 3 | 94 | 98 | | |

Conditions: 15 g. lanthanide oxides/liter, 3.5 grams of ozone/hour.

Tests 1 through 4 using lanthanide nitrates, show that essentially complete CeO₂ precipitation occurs at pH 5.5, but that above pH 5.0 product purity decreases. It is also apparent from this data that precipitation rate increases with increasing pH. Tests 5 through 8 are similar to tests 1 through 4 except that the nitrate ion was replaced by the chloride ion. Test number 6 at pH 4.5 resulted in the higher CeO₂ purity; 98 percent at 98 percent recovery. Test 8 shows that even at room temperature, lanthanum purity is considerably upgraded at pH 6.5.

Test 9 through 13, conducted with lanthanide sulfate solutions, are similar to the above tests but also show the deleterious effect of operating at low pH values. The best results are at pH 5.5, comparable to the results from the chloride system obtained at pH 5 (test 7). Tests 14 and 15 and 16 through 19, conducted with nitrate and chloride solutions respectively, show the effect of operation at an elevated temperature, 85° C. Precipitation rate increased with temperature and CeO₂ purity decreased. However, corresponding La₂O₃ purities in the filtrate increased to a maximum of 94–96 percent at pH 6.5.

Test number 20 combines operations to produce both upgraded lanthanum and cerium products. The lanthanum in the filtrate was purified first by operating at pH 6.5 at 85° C. The precipitate from this step was redissolved in nitric acid and reozonated at pH 4.5 at room temperature to produce a purified CeO₂ precipitate. The filtrate from the second step is concentrated in elements heavier than cerium.

To illustrate the capability of this invention to produce a very pure product, a 98 percent CeO₂ precipitate obtained by the process was reworked by dissolving it in a chloride solution. While maintaining the solution at 25° C. and a pH of 5.5, ozone was bubbled through for 2 hours. The resultant precipitate was 99.9+ percent CeO₂.

Although the particular process described is well adapted to carry out the objects of the present invention, it is to be understood that various modifications and changes can be made all coming within the scope of the following claims.

What is claimed is:

1. A process for separating cerium and lanthanum from one another in a mixture of lanthanides in solution, comprising injecting ozone into said lanthanide solution while said lanthanide solution is maintained at a pH of from about 1.0 to about 7.0 and at a temperature of from about 20° C. to about 100° C. to form a substantially lanthanum-free precipitate containing CeO₂; and separating said precipitate from resultant ozone-treated lanthanide solution.

2. The process of claim 1 wherein said cerium- and lanthanum-containing lanthanide solution is maintained at a pH of from about 3.5 to about 5.5 and a temperature of from about 20° C. to about 50° C. to precipitate substantially pure CeO₂.

3. The process of claim 1 wherein said cerium- and lanthanum-containing lanthanide solution includes at least one lanthanide heavier than cerium and wherein said solution is maintained at a pH of from about 6 to about 7 and a temperature of from about 50° C. to about 100° C. to precipitate oxides of each lanthanide in said lanthanide solution which is heavier than lanthanum, whereby said resultant ozone-treated lanthanide solution contains mainly lanthanum in solution.

4. The process of claim 3 further comprising dissolving said lanthanide oxide precipitate in a solvent to form another solution; injecting ozone into said another solution while said another solution is maintained at a pH of from about 3.5 to about 5.5 and a temperature of from about 20° C. to about 50° C. to form a precipitate containing substantially pure CeO₂; and separating said substantially pure CeO₂ precipitate from resultant solution.

5. The process of claim 1 wherein said cerium- and lanthanum-containing lanthanide solution is selected from the group consisting of chloride, nitrate, and sulfate solutions.

6. The process of claim 2 wherein said cerium- and lanthanam-containing lanthanide solution is selected from the group consisting of chloride, nitrate, and sulfate solutions.

7. The process of claim 3 wherein said cerium- and lanthanum-containing lanthanide solution is selected from the group consisting of chloride and nitrate solutions.

8. The process of claim 5 wherein an alkaline agent is injected into said lanthanide solution to maintain said pH.

9. The process of claim 4 wherein said another solution is selected from the group consisting of chloride, nitrate, and sulfate solutions, and wherein an alkaline agent is injected into said lanthanide solution to maintain said pH.

References Cited

UNITED STATES PATENTS 2,222,924  11/1940  Weiss _____ 23—22 X

OTHER REFERENCES

Spedding et al.: "The Rare Earths," John Wiley & Sons, Inc., New York, 1961, page 34.

HERBERT T. CARTER, Primary Examiner.

U.S. Cl. X.R.

23—183, 23, 24